Nov. 29, 1938.　　　R. E. BECHTOLD　　　2,138,755
LIQUID DISPENSING APPARATUS
Filed Sept. 7, 1937　　　4 Sheets-Sheet 1
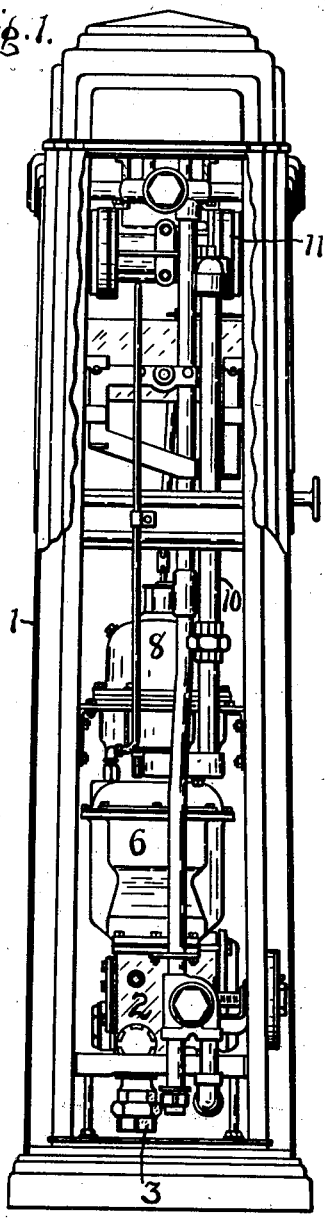
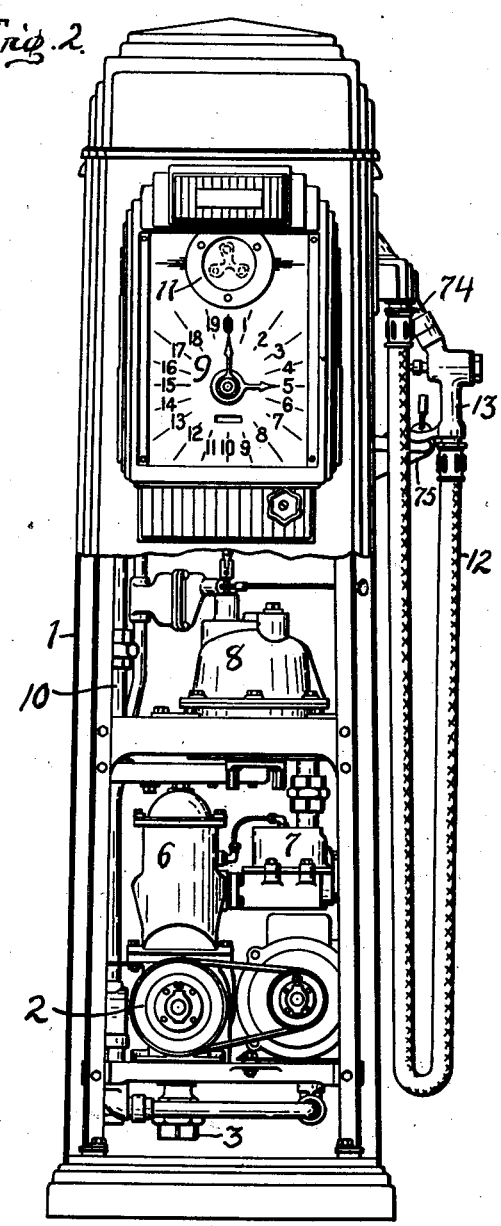
Reuben E. Bechtold INVENTOR.
BY
　　　　　ATTORNEY.

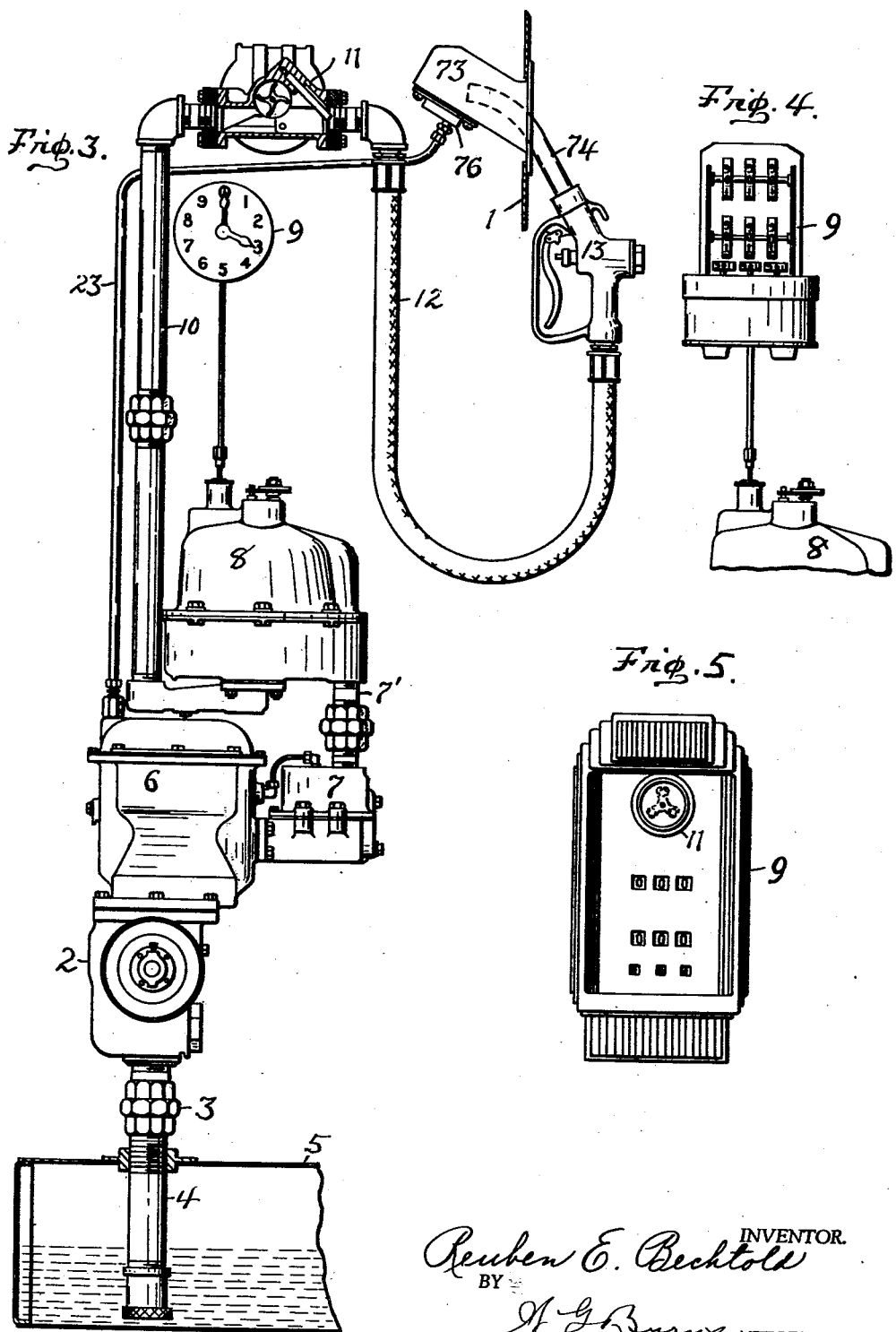

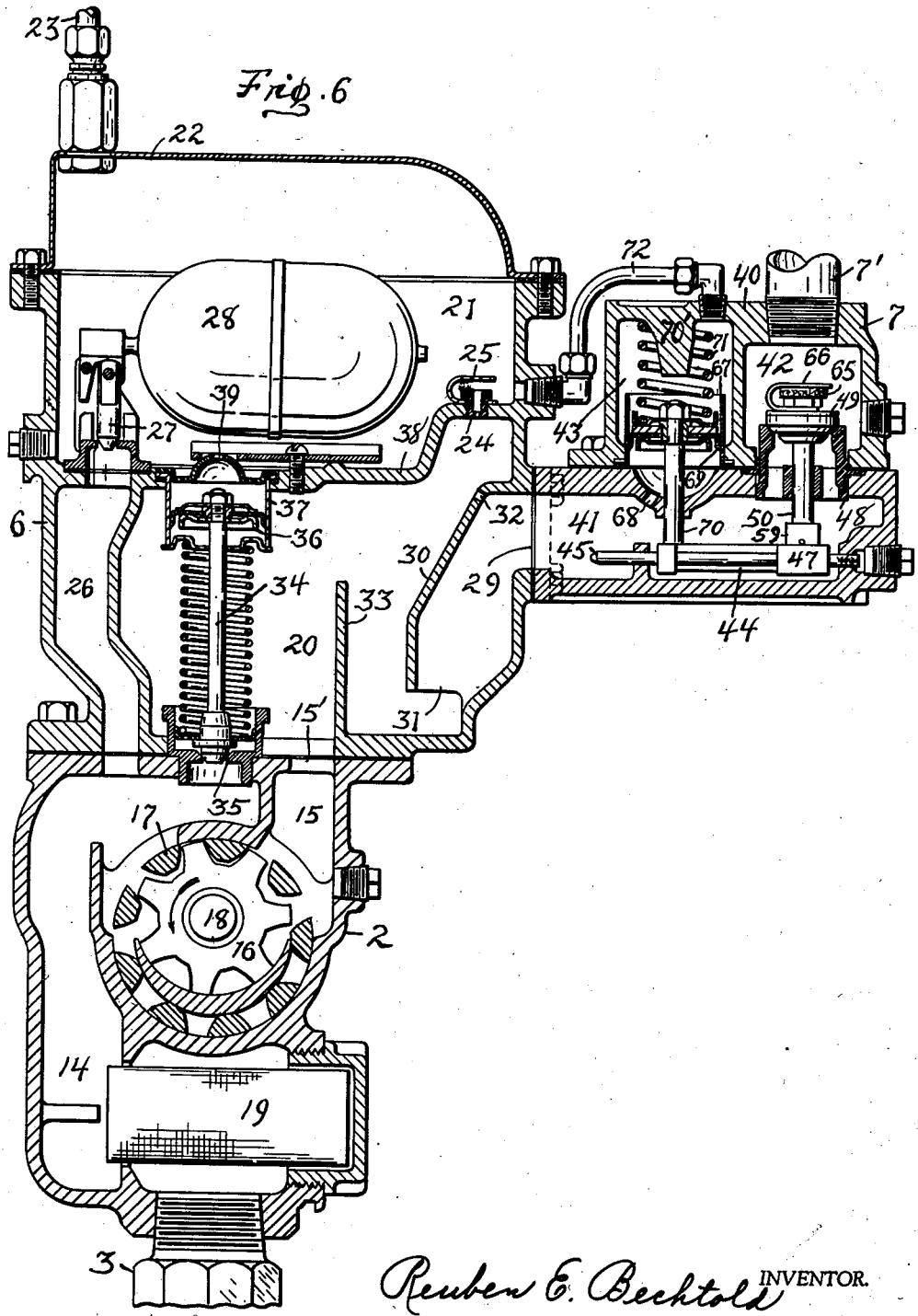

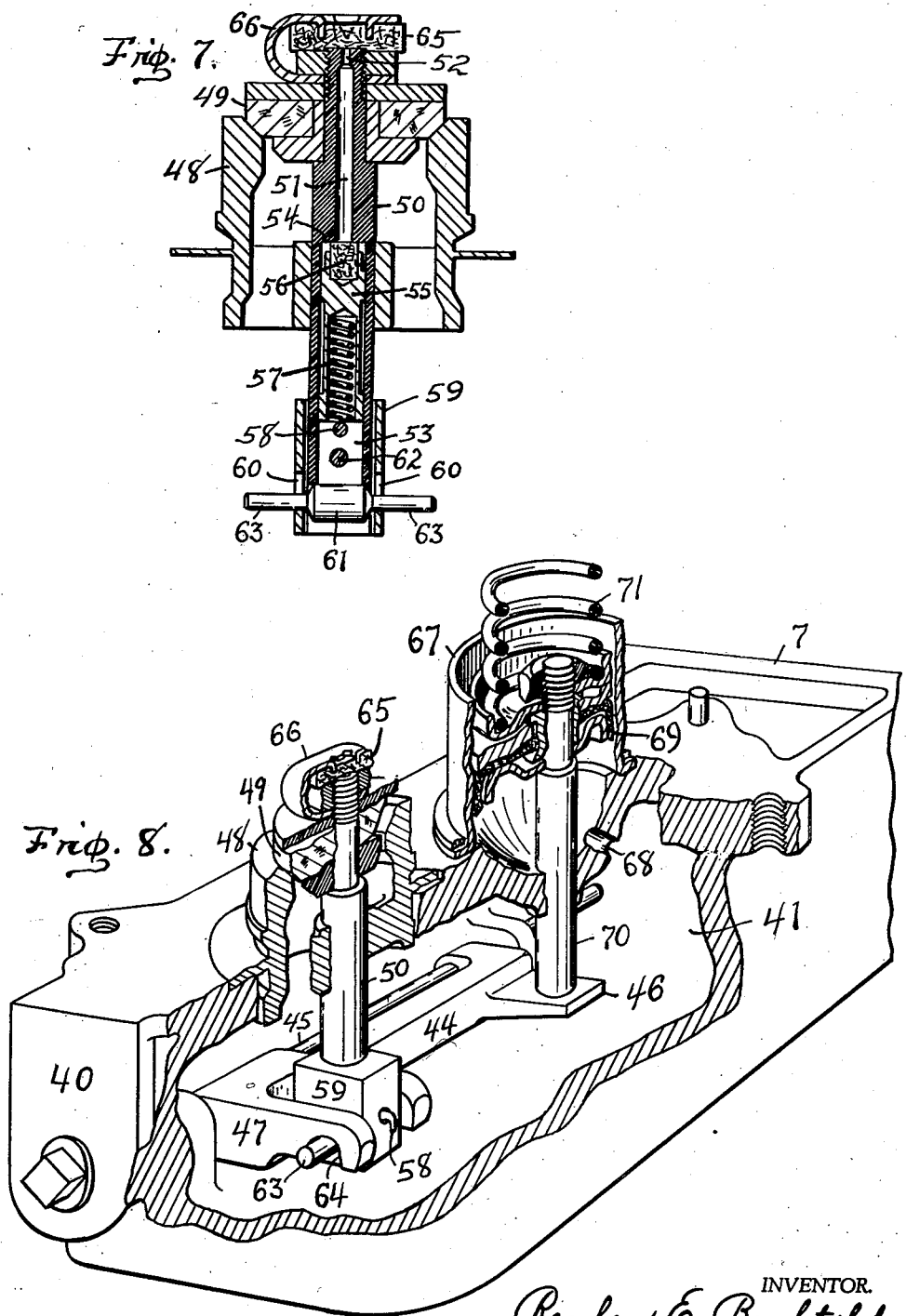

Patented Nov. 29, 1938

2,138,755

UNITED STATES PATENT OFFICE 2,138,755

LIQUID DISPENSING APPARATUS

Reuben E. Bechtold, Fort Wayne, Ind., assignor to Tokheim Oil Tank and Pump Company, Fort Wayne, Ind., a corporation of Indiana Application September 7, 1937, Serial No. 162,584

4 Claims. (Cl. 221—95)

This invention relates to improvements in liquid dispensing apparatus such as are used at filling stations for supplying motor driven vehicles with gasoline. The apparatus herein set forth is of that type in which is employed an electric motor driven pump by which gasoline is withdrawn from an underground storage tank and delivered through a flow line to the customer after passing through a meter or measuring appliance connected in the flow line.

Generally, in dispensers of the type here involved there is maintained, in the flow line, pressure of the liquid to be dispensed, the final discharge of which is governed by a manually operated valve-controlled nozzle. The meter connected in the flow line is actuated by the passage through the flow line of the liquid as it is dispensed upon opening of the dispensing nozzle. Also, it is desirable to maintain, during idle periods between dispensing operations, the liquid pressure in the dispensing line established therein upon operation of the pump, thus to prevent disturbance of the meter, and the computing mechanism actuated thereby, when the pump is started preliminary to a subsequent dispensing operation and while the dispensing nozzle is still closed. Should the operating pressure in the dispensing line fall depreciably upon stopping of the pump, the parts constituting the flow line, including the meter, ordinarily would relax, and upon again starting the pump the pressure in the dispensing line would then be raised causing expansion of the flexible hose and consequent flow of entrapped liquid in the dispensing line and the meter, even though the dispensing nozzle is closed the computer would be advanced and thus falsely indicate an amount of liquid that had not been actually delivered.

An object therefore of the invention is to maintain the normal operating pressure in the flow line including the meter and the dispensing hose, when once established therein by operation of the pump, thereby to obviate unintentional advancement or lagging of the meter.

Another object of the invention is to entrap in the flow line and meter, the liquid contained therein when the nozzle is closed, thus to substantially maintain the operating pressure of the entrapped liquid and thereby sustain the original prime of the apparatus.

A further object of the invention is to provide a metering gasoline dispenser constructed so as to be maintained in proper condition continuously irrespective of occasional idle periods.

It also is an object of the invention to include in the construction of a gasoline dispenser means for maintaining its prime during periods between operations of the dispenser, even though protracted, to thereby circumvent short measuring upon subsequent delivery of gasoline from the dispenser.

Other objects and advantages of the invention will appear in the following description.

An illustrative embodiment of the invention is shown in the accompanying drawings, in which:—

Fig. 1 is a side elevation of the dispensing apparatus, a portion of its casing being broken away to expose the interior mechanism;

Fig. 2 is a front elevation projected from Fig. 1, a portion of the casing being broken away;

Fig. 3 is an elevation showing a connected group of the various operating units of the dispenser, Fig. 4 is a fragmentary elevation showing the meter in connection with the counter or computer;

Fig. 5 is a front elevation of the counter or computer modified with respect to Fig. 2;

Fig. 6 is an elevation in section showing the pumping unit including the valve regulated outlet;

Fig. 7 is a detail elevation in section of a check-valve used in the appliance; and Fig. 8 is a fragmentary perspective view of the regulating valve mechanism for the outlet of the pump, parts being broken away.

The invention is constituted of a group of connected operating units conveniently associated with a housing 1. In the group are included a pump unit 2 provided with a motor 2' for driving it and having a suction inlet 3 connected by a pipe 4 with a storage tank 5; an air eliminating unit 6 connected with the outlet of said pump; a regulating valve mechanism 7 connected with the liquid outlet of said air eliminator; a meter 8 connected with the outlet chamber of said regulating valve mechanism; a counter or computing unit 9 actuated by the meter; and a dispensing line 10 in which is connected a sight gauge 11 and which terminates with a flexible hose 12 provided with a manually operated valve-controlled nozzle 13.

In the illustrative embodiment of the invention the pump 2 preferably is of a well known gear type having a suction chamber 14, an outlet chamber 15, rotor members 16—17, and drive shaft 18, there being a screen 19 disposed in the suction chamber through which liquid is drawn from the storage tank 5 upon operation of the pump.

Air eliminator

The air eliminator unit 6 is mounted upon the pump unit 2, and is provided with a receiving chamber 20 having free communication with the outlet chamber 15 of the pump through a duct 15'. The eliminator also includes a float chamber 21 having a cover 22 therefor provided with a vent pipe 23 at its top. The upper extremity of the receiving chamber 20 has communication with the float chamber 21 through a restricted passageway 24 to permit a constant passage therethrough of only a sufficient amount of fluid to relieve the receiving chamber of substantially all contained gas and air from the receiving chamber and thus leaving an exclusively liquid body within the receiving chamber 20. Preferably, a deflector 25 extends over the passageway 24 spaced therefrom sufficiently to cause lateral deflection of the fluid discharge through the passageway into the float chamber. There is provided a duct 26 affording communication between the float chamber 21 and the suction chamber 14 of the pump, there being a valve 27 controlled by a float 28 located in the chamber 21 arranged so that upon flooding of the float chamber by accumulations of liquid entering therein through the passageway 24, the float is raised causing the valve to open which permits the accumulated liquid to be drawn from the receiving chamber into the suction chamber of the pump while the gas and air escapes from the float chamber through the vent pipe 23.

The receiving chamber 20 has an outlet 29 and there is provided a shield 30 within said chamber extending over the outlet from the top thereof downwardly, said shield being open at its bottom to provide an outflow passageway 31. The shield has a small vent opening 32 for the escape of pocketed air and gas from the shield into the upper extremity of the receiving chamber. There is also provided in the receiving chamber a vertically disposed baffle 33 located between the shield 30 and the duct 15', the top of the baffle being substantially higher than the passageway 31 thus to insure movement of entering liquid to the upper part of the receiving chamber before reaching the outflow passageway.

As in the patent issued to me July 10, 1932, No. 1,868,444, for an air eliminator for liquid, the receiving chamber 20 has disposed therein a spring-restrained piston operated by-pass valve 34 for controlling a valve opening 35 through which liquid in the receiving chamber is permitted to pass into the suction chamber of the pump upon opening of the valve 34. The stem of the valve 34 has secured on its top a piston 36 that has movement in a cylinder member 37 which is secured in the partition 38 that separates the receiving and float chambers.

A vent opening 39 in the upper end of the cylinder member 37 affords communication between the cylinder member and the float chamber and relieves pressure or vacuum during movement of the piston therein. The arrangement of the by-pass valve and its operating parts are such that when the pressure is raised in the receiving chamber above a predetermined point, which occurs when the nozzle is closed or partially closed while the pump is operating, the valve is automatically opened permitting circulation of liquid through the pump and receiving chamber.

Regulating valve mechanism

The regulating valve mechanism 7 consists of a valve housing 40 having therein three chambers 41, 42 and 43. The valve housing is secured to the air eliminator unit 6 so that the outlet 29 has free communication with the lower chamber 41 in the valve housing. Within the lower chamber 41 is disposed a rock member 44 mounted loosely upon a stationary horizontal shaft 45 therein, said rock member having at one end thereof a lug 46, and at its opposite end a bifurcated lug 47.

A valve seat 48 of tubular form is secured in the valve housing, upon the upper end of which is disposed an outlet valve 49 for controlling communication between the lower chamber 41 and the outlet chamber 42 of said valve housing. The valve 49 has a stem 50 that extends down through the valve seat tube 48. The valve stem has an axial bore 51 extending from one end to the other (Fig. 7).

Relief valve

Preferably, the upper end of the bore in the outlet valve stem 50 is small and constitutes a restricted passageway 52. The lower portion of the bore 51 is enlarged, as indicated by 53, there being an offset 54 formed to provide a valve seat. In said enlarged portion of the bore is loosely disposed a relief valve 55, the upper end of which preferably is provided with a plug 56 of resilient material that normally bears against the offset or seat 54. The lower end of the valve 55 is hollow and contains a compression spring 57 for holding the valve in seated position, the lower end of said spring being sustained upon a pin 58 that extends through the stem. In this manner the valve plug 56 is yieldingly held in closed position.

Upon the lower end of the stem 50 is secured a hollow block 59 having opposite openings 60 through which extends a pin 61, said block being secured to the stem by a pin 62. The central portion of the pin 61 is enlarged and the openings are of sufficient diameter as to permit said enlarged portion to be inserted therethrough into operating position before the pin 62 is introduced. In this manner the block and the pin 61 are locked in connected relation with the stem 50. The outer ends of the pin 61 extend outwardly and constitute trunnions 63 that have pivotal engagement with the bifurcated lug 47 on the rock member 44, there being notches in the lower faces of the arms of the bifurcated lug, as indicated by 64, for their reception.

A strainer 65, consisting of a thick pad of felt, is positioned upon the top of the valve stem 50 to cover the restricted passageway 52 and is held in place by an overhanging bracket 66 that is secured upon said stem. By this means excessive back pressure in the chamber 42 is relieved by passage of fluid through the strainer past the valve 55 into the lower chamber 41 and from thence to the receiving chamber 20 and to the float chamber 21.

The regulator

In the chamber 43 of the regulating valve mechanism 7 is disposed a cylinder 67, the lower end of which has communication with the lower chamber 41 through a small passageway 68, and in said cylinder is disposed a piston 69 provided with a piston rod 70, the lower end of which rests upon the lug 46 on the rock member 44 (Fig. 8). A compression spring 71 disposed in the chamber 43 bears upon the top of the piston 69 thereby causing downward pressure upon the lug 46 and consequent tilting movement of the rock member 44. This downward urge is transmitted to the valve stem 50 through the medium of the rock member 44, and thus the outlet valve 49 is forcefully held in closed position. A pendant lug 70' in the chamber 43 serves as a stop for limiting upward stroke of the piston rod 70 by having contact therewith approximately at a point when the outlet valve reaches its full opening movement.

A breathing and drain pipe connection 72 is made between the upper end of the chamber 43 of the regulating valve mechanism and the float chamber 21 of the air eliminating unit 6 that obviates pressure resistance to movements of the piston 69 and affords escape for accumulations of liquid seepage from the chamber 43. The spring-pressed piston 69, its piston rod 70, and the rock member 44 function as a pilot to prevent opening of the outlet valve 49 until a predetermined pressure is developed within the lower chamber 41 in the regulating valve mechanism 7.

The motor driven pump 2, air eliminator 6, valve mechanism 7, meter 8 and the counter or computer 9, thus assembled in operative relation, are mounted in the housing 1 as in the usual manner, and preferably, there is provided in the upper portion of the housing a pocket 73 for the reception of the spout 74 on the nozzle 13 when the nozzle is lodged on the supporting hook 75 provided on the housing for its support when not in use. The vent pipe 23 for the float chamber 21 extends upwardly therefrom and terminates wih a screen member 76 through which air and gas vented from the float chamber is freed through the pocket 73 to the atmosphere.

The chamber 42 of the valve regulating mechanism is connected with the inlet of the meter 8 by a pipe connection 7', and the outlet of the meter is connected, as in the usual practice, with the dispensing line 10. With the parts thus arranged and connected the dispenser is then in readiness for operation.

Operation

The construction and operation of the by-pass valve 34, the float-controlled valve 27, and the supply pump 2 are similar to the corresponding elements disclosed in my previous Patent No. 1,868,444, issued to me July 19, 1932.

The present invention has a regulating valve mechanism 7 provided with an outlet valve that is restricted in its opening movement by a pilot whereby the outlet valve is permitted to open only when a predetermined pressure is developed in the receiving chamber by action of the pump. The pilot also functions to cause immediate closing of the outlet valve when the pressure developed by the pump in the receiving chamber recedes below the predetermined point as when the pump is stopped and the pressure in the receiving chamber is relieved through the passageway 24. The outlet valve becomes seated, due to action of the pilot spring 71, with increasing force as the pressure in the receiving chamber 20 recedes. The objective is to insure tight seating of the outlet valve upon closing of the valve of the nozzle and stopping of the pump, thus to effectively prevent backflow into the receiving chamber 20 from the dispensing line. In this manner the dispensing line, meter and sight gauge are kept completely filled with liquid which obviates accumulation of air and gas therein and consequent short measurement upon subsequent delivery operations.

When the nozzle valve is closed upon completion of delivery of gasoline to the patron, and the pump is stopped, pressure in the receiving chamber 20 and lower chamber 41 of the regulating valve mechanism is relieved through the passageway 24, and consequently, pressure in the cylinder 67 beneath the piston 69 is relieved through the passageway 68, whereupon the piston is forced downwardly by action of the spring 71 causing downward tilting of the rock member 44 and forceful seating of the outlet valve 49. Upon subsequent operation of the apparatus, when the pump is started, pressure in the chambers 20 and 41 and in the cylinder 67 is again raised, causing the piston 69 to move upwardly in opposition to restraint of the spring and out of contact with the rock member, thus permitting outflow of liquid, past the outlet valve 49, through the pipe connection 7', meter 8, and dispensing line 10 when the dispensing nozzle 13 is opened by the operator.

By this arrangement pressure is maintained in the receiving chamber sufficient to insure substantially complete elimination of transient air and gas therefrom.

The relief valve 55 permits backflow of liquid from the dispensing line when the liquid trapped therein is caused to expand incidental to rise in temperature, or, bending or coiling of the hose. In this manner excessive pressure in the dispensing line is obviated.

What I claim is:

1. In a liquid dispenser having a supply means and a dispensing line including an air eliminator and meter connected therein, a regulating mechanism connected in said line between said eliminator and the meter, said mechanism having therein an outflow check valve, a spring-restrained pilot actuated by liquid pressure in said line, a member operatively associated with the pilot and check valve whereby opening of the check valve is dependent upon operation of the pilot, and a spring-restrained back-flow relief valve connected in the dispensing line.

2. In a liquid dispenser having a supply means and a dispensing line including an air eliminator and meter connected therein, a regulating mechanism connected in said line between said eliminator and the meter, said mechanism having therein an outflow check valve, a spring-restrained pilot actuated by liquid pressure in said line, and a member operatively associated with the pilot and check valve whereby opening of the check valve is dependent upon operation of the pilot.

3. A regulating mechanism connected in the dispensing line of a liquid dispenser, said mechanism having an outflow check valve, a spring-restrained pilot actuated by liquid pressure in said line, a rock member controlling said check valve and controlled by said pilot member, and a spring-restrained back-flow relief valve connected in the dispensing line.

4. A regulating mechanism connected in the dispensing line of a liquid dispenser, said mechanism having an outflow check valve, a spring-restrained pilot actuated by liquid pressure in said line, and a rock member controlling said check valve and controlled by said pilot member.

REUBEN E. BECHTOLD.